US008963883B2

(12) United States Patent
Narendra et al.

(10) Patent No.: US 8,963,883 B2
(45) Date of Patent: Feb. 24, 2015

(54) TOUCHLESS INTERACTIVE DISPLAY SYSTEM

(75) Inventors: Patrenahalli M. Narendra, Barrington, IL (US); Eric S. Reifsnider, Chapel Hill, NC (US); Veeraraghavan A. Anantha, Lexington, MA (US)

(73) Assignee: Symbol Technologies, Inc., Holtsville, NY (US)

( * ) Notice: Subject to any disclaimer, the term of this patent is extended or adjusted under 35 U.S.C. 154(b) by 989 days.

(21) Appl. No.: 13/050,248

(22) Filed: Mar. 17, 2011

(65) Prior Publication Data

US 2012/0235892 A1 Sep. 20, 2012

(51) Int. Cl.
*G06F 3/042* (2006.01)
*G06F 3/01* (2006.01)
*G06F 3/03* (2006.01)

(52) U.S. Cl.
CPC ............ *G06F 3/0304* (2013.01); *G06F 3/0428* (2013.01); *G06F 3/017* (2013.01); *G09G 2370/24* (2013.01); *G06F 2203/04108* (2013.01)
USPC ........................................ 345/175; 178/18.09

(58) Field of Classification Search
CPC ........................................ G06F 3/0425–3/0426
USPC ..................... 178/18.01–19.07; 345/173–178
See application file for complete search history.

(56) References Cited

U.S. PATENT DOCUMENTS

| | | | |
|---|---|---|---|
| 7,170,492 B2 | 1/2007 | Bell | |
| 7,348,963 B2 | 3/2008 | Bell | |
| 7,692,625 B2 | 4/2010 | Morrison et al. | |
| 7,956,842 B2 | 6/2011 | Ting | |
| 2004/0046744 A1 | 3/2004 | Rafii et al. | |
| 2005/0023448 A1 | 2/2005 | Ogawara et al. | |
| 2005/0110964 A1 | 5/2005 | Bell et al. | |
| 2008/0150913 A1 | 6/2008 | Bell | |
| 2009/0244018 A1 | 10/2009 | Lin et al. | |
| 2010/0110005 A1 | 5/2010 | Chtchetinine et al. | |
| 2010/0118123 A1 | 5/2010 | Freedman et al. | |
| 2010/0163627 A1 | 7/2010 | Olmstead | |

(Continued)

FOREIGN PATENT DOCUMENTS

JP 2005-353071 A 12/2005
WO 2009035705 A1 3/2009

OTHER PUBLICATIONS

International Search Report and Written Opinion for International Patent Application No. PCT/US2012/026493 issued on Jul. 12, 2012.

(Continued)

*Primary Examiner* — Michael Pervan
(74) *Attorney, Agent, or Firm* — Brian M. Mancini (57) ABSTRACT

A touchless interactive display system includes a display with a display area bounding the display. A reflective surface is located along an edge of the display. One optical sensor opposes and faces the reflective surface so that the optical sensor has a primary, non-reflected field of view and a secondary, reflected field of view that is reflected back from the reflective surface. The primary field of view covers a first portion of the display area that is less than the whole display area, and the reflected field of view covers a second portion of the display area, such that the first and second portions of the display area cover the entire display area. The optical sensor and a processor are operable to detect an object placed within at least one of its first and second fields of view without having the object touch the display.

13 Claims, 11 Drawing Sheets

(56) References Cited

U.S. PATENT DOCUMENTS

2010/0201812 A1    8/2010    McGibney et al.
2010/0245289 A1    9/2010    Svajda

OTHER PUBLICATIONS

Office Action dated Aug. 5, 2014 in counterpart Japanese Patent application 2013-558023, plus English language summary of the office action and the current claims in English.

TOUCHLESS INTERACTIVE DISPLAY SYSTEM

FIELD OF THE DISCLOSURE

The present invention relates generally to a display system and more particularly to a touchless interactive display system.

BACKGROUND

Interactive display devices, such as can be found in entertainment or retail environments, can be implemented with various user interfaces. These interfaces can include at the simplest, a keyboard and/or mouse, and at the more advanced, an integral touchscreen and three-dimensional depth camera systems. A keyboard and mouse are devices that are subject to mechanical damage, and once damaged, prevent to use of the interactive display, which is undesirable, particularly in a retail environment. In addition, a keyboard and mouse are increasingly seen as being unsanitary as multiple individuals interact with these devices in public places.

Touchscreens can impart user interactivity to public digital displays. However, conventional touchscreens encourage physical touching of the screen which is also being increasingly seen as being unsanitary as multiple individuals interact with the touchscreens. Further, conventional touch screens more than double the cost of displays or monitors, particularly in sizes larger than forty inches.

Three-dimensional depth (i.e. time-of-flight or structured light) camera systems have been introduced which can detect the location in a space of objects, such as a user's hand of finger, placed within the camera's field of view. However, due to the conical nature of the observed field of view and the rectangular nature of display screens, blind spots are created, making it necessary to utilize multiple cameras to capture the entire extent of a display screen. This adds hardware and computational requirements which increases complexity and cost to the interactive display. Alternatively, one camera could cover an entire extent of a display screen if it were far removed from the display screen. However, this greatly reduces the locationing ability and accuracy of the camera.

What is needed is a robust, low-cost technique of non-contact interactivity which closely resembles and extends the touch gestures familiar to touchscreen users while not requiring physical contact with the screen while using a single optical sensor.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a novel technique for a robust, low-cost technique of non-contact interactivity which closely resembles and extends the touch gestures familiar to touchscreen users, while not requiring physical contact with the screen, using a single optical sensor. In particular, the present invention uses a single optical sensor, such as a depth sensing camera, mounted near the interactive display, to sense gestures within the space before the display screen in order to emulate a touchscreen interface. Specifically, the camera can emulate the touchscreen interface of a smartphone, including single-touch, multi-touch, and single or multi-touch swipes, as well as the conventional mouse interaction of a desktop computer, all without a user physically making contact with the display screen. Preferably, the sensor is attached to the display to provide a compact form factor.

Figure 1:
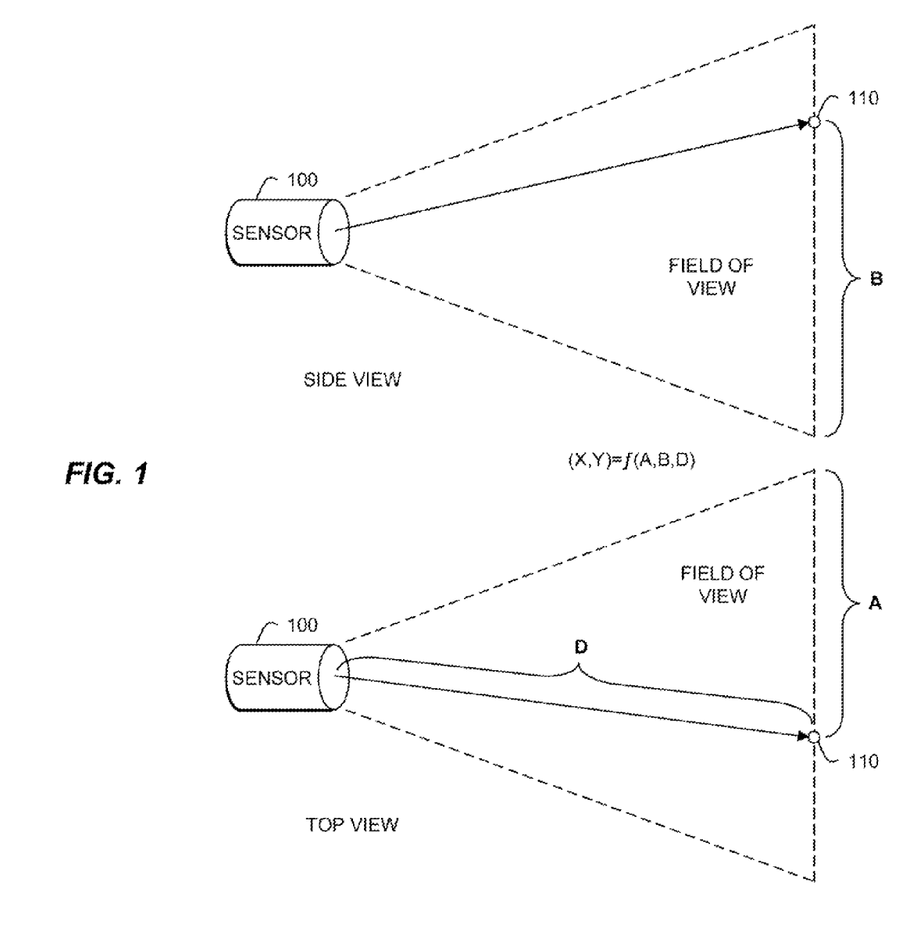
FIG. 1 is a top and side view of the field of view of a three-dimension depth camera.

FIG. 1 is a top and side view of the field of view of an optical sensor 100. Preferably, the optical sensor is a three-dimensional depth (i.e. time-of-flight or structured light) camera that can detect a location of an object that is placed in a space before the camera that is before the surface of a display screen. The field of view of the camera is typically a conical or pyramidal space, but can assume any shape. Alternatively, the camera can be a two-dimensional device. The camera typically includes a charge-coupled-device utilizing pixels, as is known in the art. An object 110, such as a user hand or finger, placed within the field of view of the camera will be detected by one or more pixels of the charge-coupled-device. The particular pixels that detect the object will define an A and B location of the object. The time-of-flight or structured light function of the camera will determine a distance D to the object. In one example, A, B, D are spherical coordinates, referenced to an optical axis of the camera, where an angular position of the object from the optical axis can be translated to a perpendicular projection of the object 110 onto rectangular X, Y coordinates of a surface of a display lying below the field of view, using known geometric principles.

In its most basic embodiment, the present invention provides a touchless interactive display system that includes a display with a display area defined by a boundary of the display, and one depth camera, such as a structured light camera for example. The depth camera has a field of view that covers the entire display area and a space with a depth perpendicular to a plane of the display area. In this embodiment, a processor is coupled with the depth camera and the display, wherein the depth camera and processor are operable to detect an object placed within the field of view, within the depth above the display, without having the object touch the display.

Figure 2:
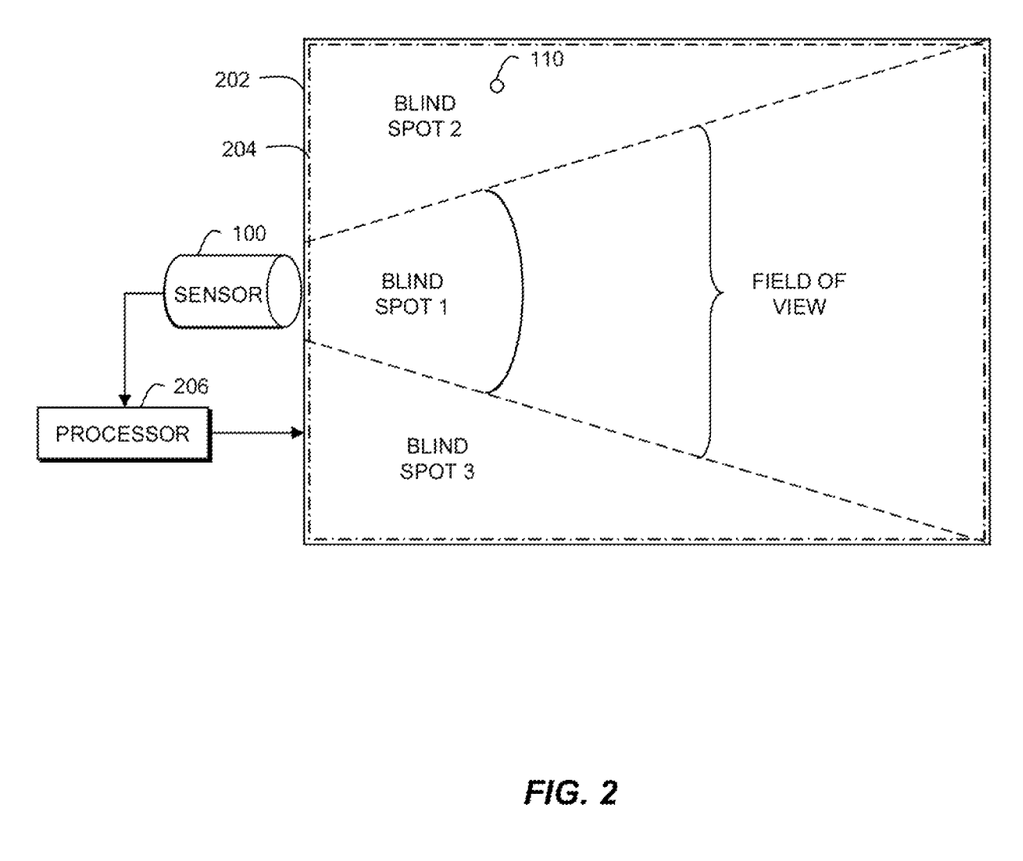
FIG. 2 is a front view of a display showing a field of view and blind spots of a single three-dimension depth camera.

FIG. 2 is a further embodiment illustrating a front view of a display 202 showing a field of view and blind spots of a single optical sensor 100, such as a three-dimension depth camera. The sensor is coupled to a processor 206, which can be a separate device or incorporated within the camera itself. The processor is operable to process image information from the sensor to determine a location of an object within the field of view of the sensor. The processor 206 (or a separate processor) includes an operating system to drive the display 202 with a touchless drive interface to recognize gestures and other user inputs and to show different passive images or video, or interactive images or video depending on the interactive functions desired. The processor(s) can comprise basic components such as, but not limited to, microprocessors, digital signal processors (DSPs), microcontrollers, computers, drivers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm or logic flow, those skilled in the art are aware of the many design and development techniques available to implement user equipment that performs the given logic. Therefore, the processor represents a known apparatus that has been adapted, in accordance with the description herein, to implement various embodiments of the present invention.

The display 202 includes a display surface area 204 defined by a boundary of a surface extent of the display. The sensor 100 faces above the surface of the display. The sensor can face directly parallel to the display, but it is preferred to angle the sensor up from the surface of the display to better cover the space above the display, given the expanding conical or pyramidal (or other) shape of the field of view of the sensor. Although the field of view shown in this example extends to the corners of the display area 204, it should be recognized that the field of view could be wider than that shown. However it is not desirable that it be narrower, as will be detailed below. In many system configurations (driven by aesthetics and physical constraints) the sensor needs to be close to the display as shown above. In such cases, a limited field of view and a minimum resolvable distance of a single three dimensional depth cameras create blind spots, which can include those spaces outside of the field of view of the camera (i.e. blind spot two and three), as well as near the exit cone of the camera (i.e. blind spot one). Therefore, an object 110 that is placed outside of the field of view (shown here in blind spot two) can not be detected ordinarily.

Figure 3:
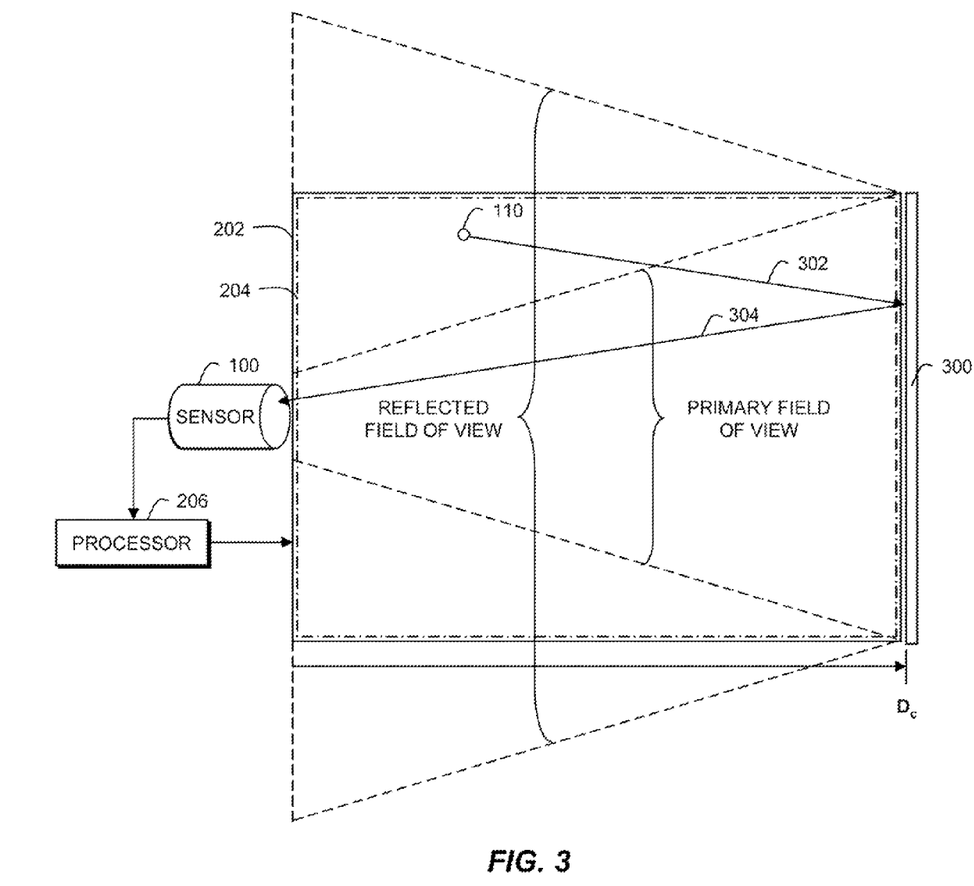
FIG. 3 is a front view of a display showing the fields of view of a single three-dimension depth camera, in accordance with a first embodiment of the present invention.

Referring to FIG. 3, the present invention introduces a substantially flat reflective surface 300 located along a portion of the boundary of the display 202, and perpendicular to a surface of the display. Preferably, the reflective surface is a mirror strip operable to reflect infrared rays from the sensor. The optical sensor 100 is disposed proximal to the boundary along an edge of the display 202 opposing the reflective surface 300 and facing the reflective surface. Preferably, the sensor is attached to the display to provide a compact form factor, but can be mounted at a distance from the display. As in FIG. 2, the optical sensor and has a primary, non-reflected field of view towards the right. However, in accordance with the present invention, the reflective surface provides a reflected field of view reflected back to the left towards the sensor from the reflective surface. The reflective surface will have a length that is at least equal to the extent of the field of view at the reflective surface's distance from the sensor, and a depth less than one-half the desired depth of the interactive system. In effect, the primary, non-reflected field of view covers a first portion of the display area less than the whole display area, and the reflected field of view covers a second portion of the display area, such that the first and second portions of the display area cover the entire display area, in accordance with the present invention.

The optical sensor and processor are operable to detect an object 110 placed within at least one of its first and second fields of view. Inasmuch as a depth camera can detected objects above the plane of the display, the object need not touch the display 202. In other words, an object can be detected at a depth above the display perpendicular to a plane of the display area 204. In this example, the sensor 100 will image the object 110 at a distance equal to the total length of paths 302 plus 304. In order that the processor knows that the location of the object is actually folded back along the reflected field of view, it is necessary that the processor know a calibrated distance $D_c$ from the camera to the reflective surface and the vertical angle of the optical axis of the sensor relative to the display surface. If the processor determines that the distance measured by the camera (paths 302 plus 304) is more than $D_c$ then the processor will be able to calculate the actual paths of 302 and 304 using known geometric techniques to determine the projected X, Y coordinates of the object on the display area.

The calibrated distance $D_c$ can be determined, either automatically or manually, by placing an object at various points along the reflective surface, and particularly the endpoints, during a calibration procedure, which can be implemented by the processor giving user instructions on the display. If the sensor is not located next to the display, calibration can also include placing an object along the edge nearest the sensor, and particularly the endpoints of the edge.

Figure 4:
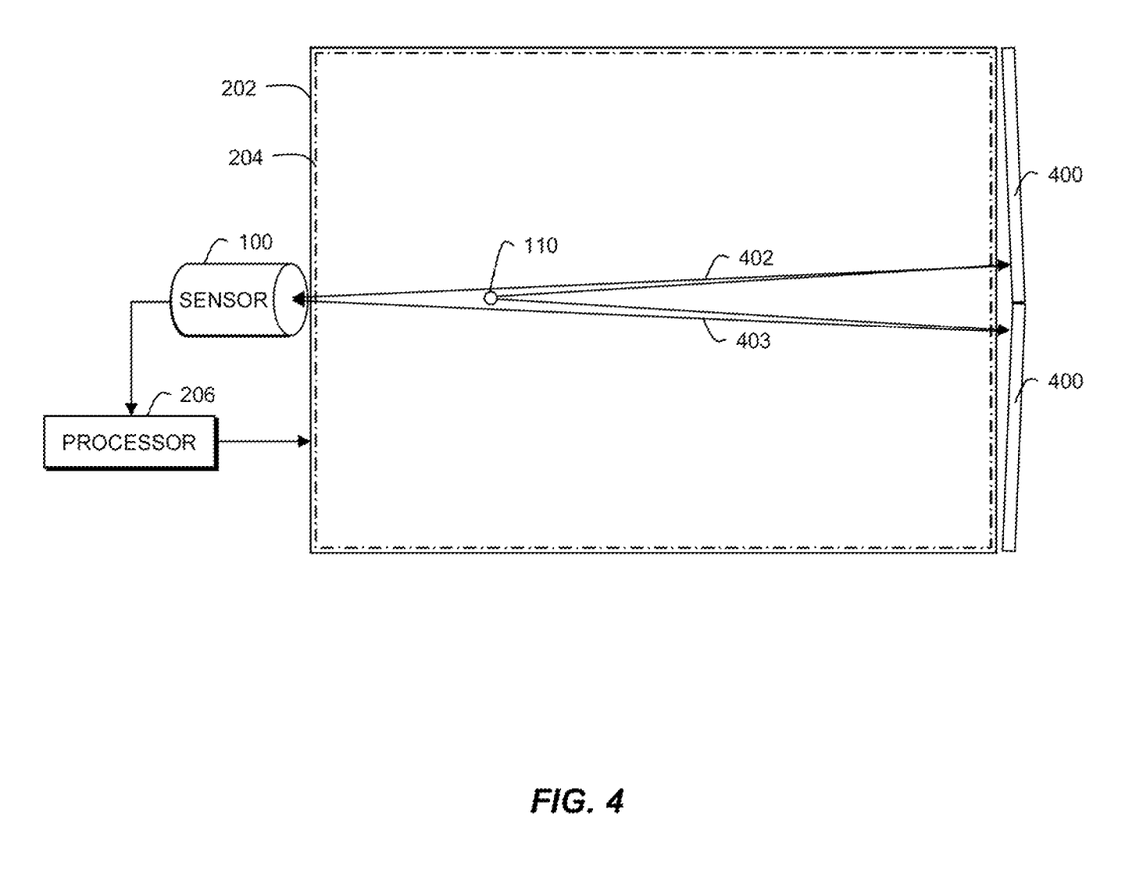
FIG. 4 is a front view of a display showing a single three-dimension depth camera, in accordance with a second embodiment of the present invention.

It may be that an object is located directly along the optical axis of the sensor. In this case, there is the potential of a reflection being obscured by the object itself. To avoid this problem, it can be beneficial for the reflective surface 300 to comprise two flat pieces 400, wherein surfaces of the two flat pieces are inclined to each other as shown in FIG. 4. This eliminates even the narrow blind spot caused by an object obscuring itself since there are two reflections 402, 403 of each object to use to resolve any shadowing or obscuration, at a slight expense of locationing accuracy.

Figure 5:
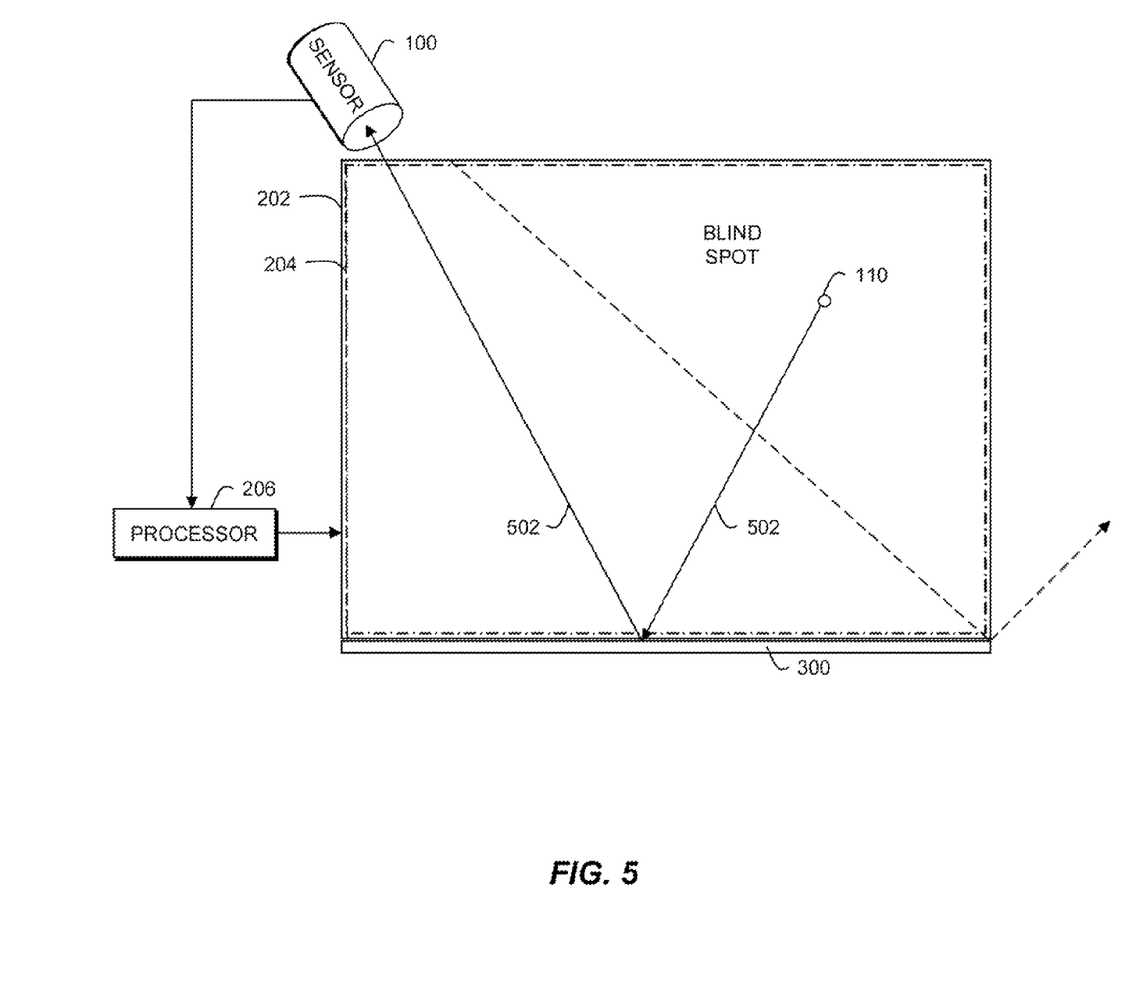
FIG. 5 is a front view of a display showing the fields of view of a single three-dimension depth camera, in accordance with a third embodiment of the present invention.

Referring to FIG. 5, it is not necessary that an optical axis of the sensor 100 be perpendicular to the reflective surface 300 or that the sensor be positioned directly opposing the reflective surface. The configuration as shown will perform equally well at detecting objects 110 that might ordinarily be in a blind spot. Advantageously, this configuration can accommodate even larger displays with no blind spots from a single sensor with the reflecting mirror. This is the preferred embodiment when the system configuration dictates that the sensor be housed close to the display itself or integrated within its case.

Figure 6:
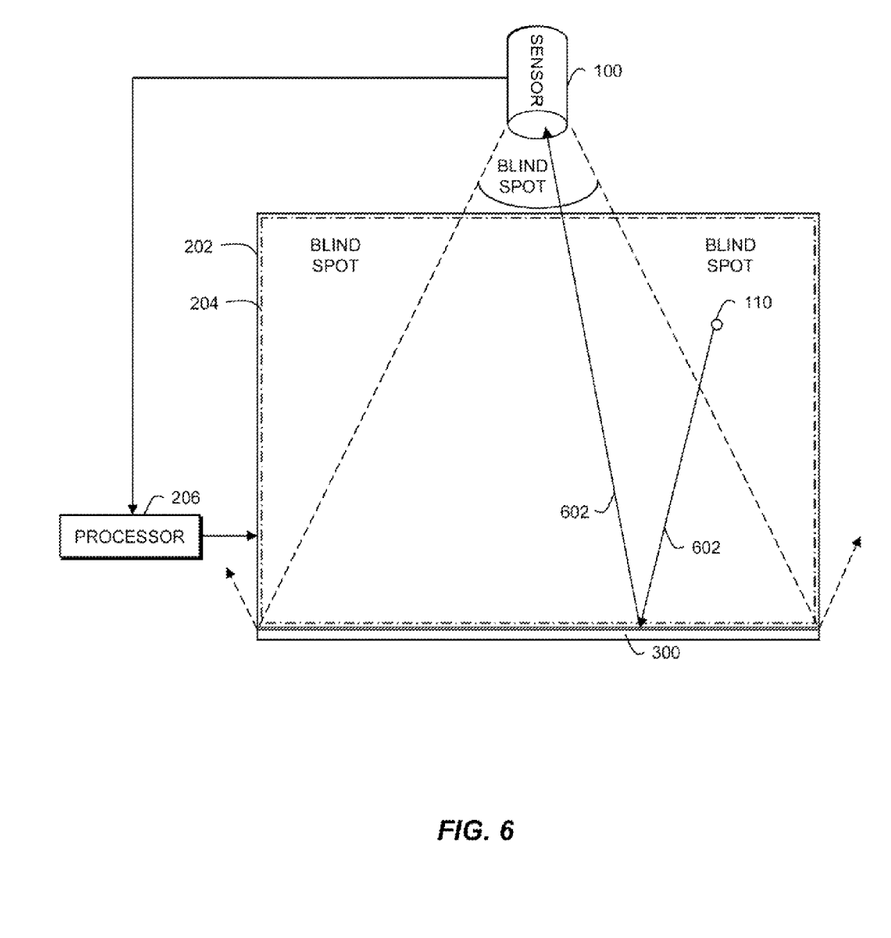
FIG. 6 is a front view of a display showing the fields of view of a single three-dimension depth camera, in accordance with a fourth embodiment of the present invention.

FIG. 6 shows an embodiment of the invention that can be used to eliminate one blind spot by placing the sensor 100 at a distance from the display area. In this case, the blind spot near the exit cone of the camera is eliminated.

Figure 7:
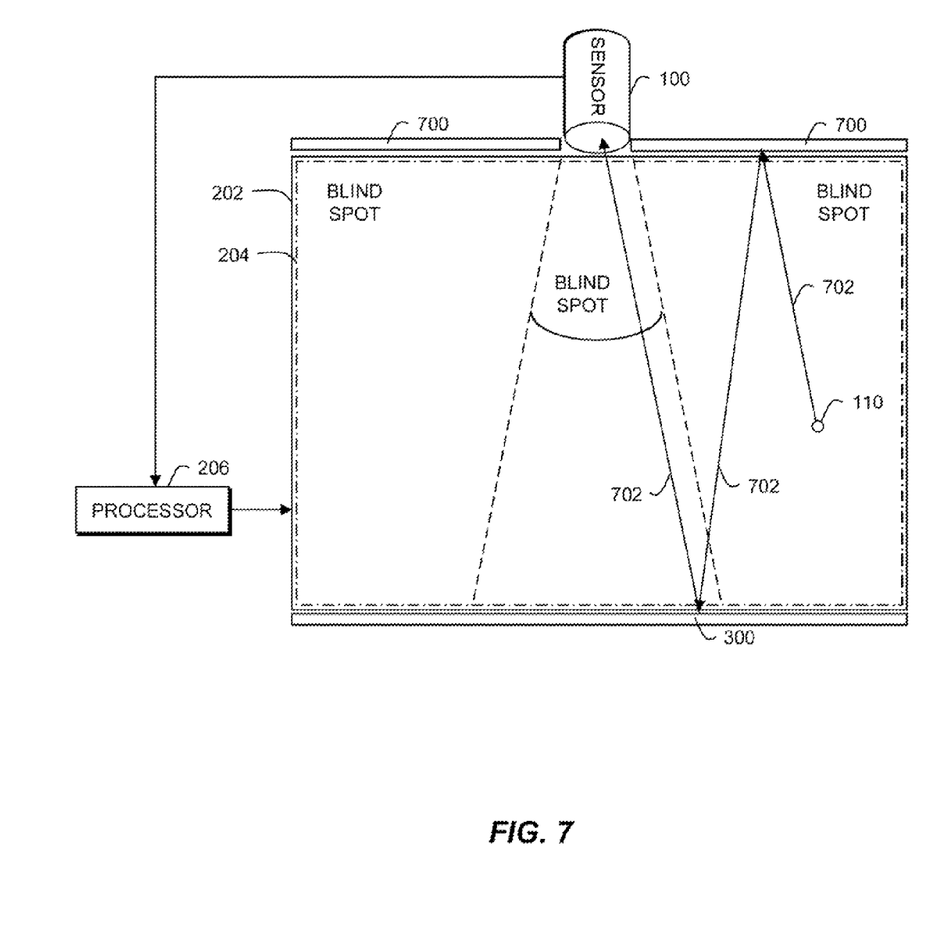
FIG. 7 is a front view of a display showing the fields of view of a single three-dimension depth camera, in accordance with a fifth embodiment of the present invention.

FIG. 7 shows an embodiment of the invention that includes a second reflective surface 700 opposing and parallel with the reflective surface 300 to provide multiple reflected fields of view. This solution can be used where the size of the display area 204 is too large, or the field of view of the camera being used is too narrow, to capture the entire display area 204 with only one reflection. In this way, very large displays can be covered by two parallel reflecting surfaces by exploiting multiple reflections. This approach is limited only by the maximum discrimination range of the depth camera. Again, it is necessary for the processor to know the distance between the two reflective surfaces to determine an actual position of the object 110. As before, it can be beneficial to use segmented reflective surfaces that are inclined to each other to prevent obscuring or shadowed objects.

Figure 8:
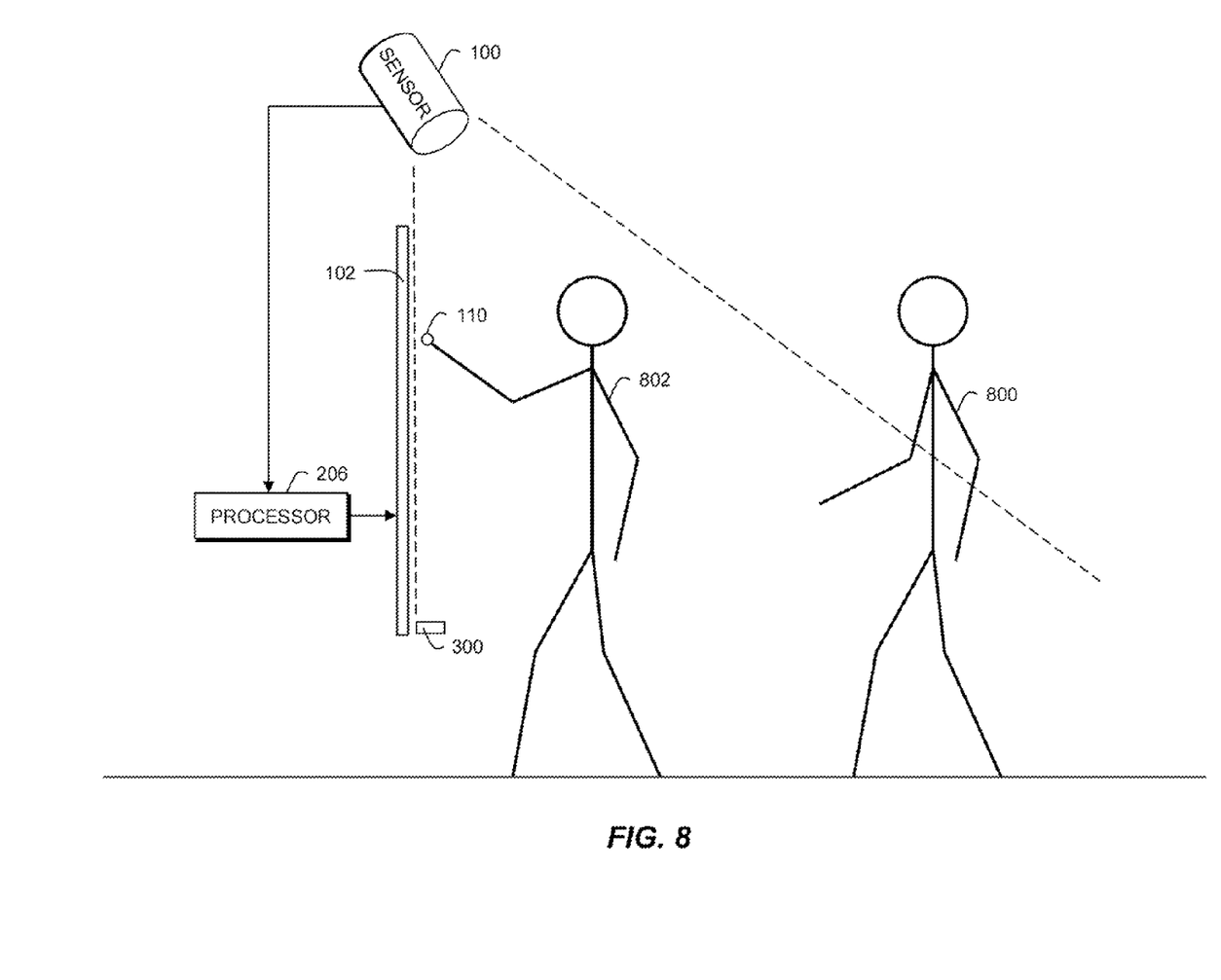
FIG. 8 is a side view of a display showing the fields of view of a single three-dimension depth camera, in accordance with a sixth embodiment of the present invention.

Although the above embodiments are directed towards detecting an object within the proximity of a display area, the ability of the present invention to detect objects at a greater perpendicular depth from a plane of the surface of the display area can be useful. For example, in the embodiment of FIG. 8 showing a side view of the display, the optical sensor 100 is disposed at a distance from the display area, wherein the primary field of view is deeper than a depth of the reflective surface 300, such that the optical sensor and processor 206 can detect movement in that is distant from the display area. In this example, a user in a retail establishment can be attracted by a passive image of predefined information (such as an advertisement) on the display 202, and the sensor can detect the movement of the approaching user 800 into the primary field of view. As the user approaches deeper into the primary field of view, wherein the user 802 is within reach of the display, the processor can direct the display to switch to an interactive mode to show interactive information on the display, which can be changed in response to a position of the user's finger or hand (i.e. object) placed within either the primary and/or reflective field of view of the optical sensor without having the user touch the display.

Figure 9:
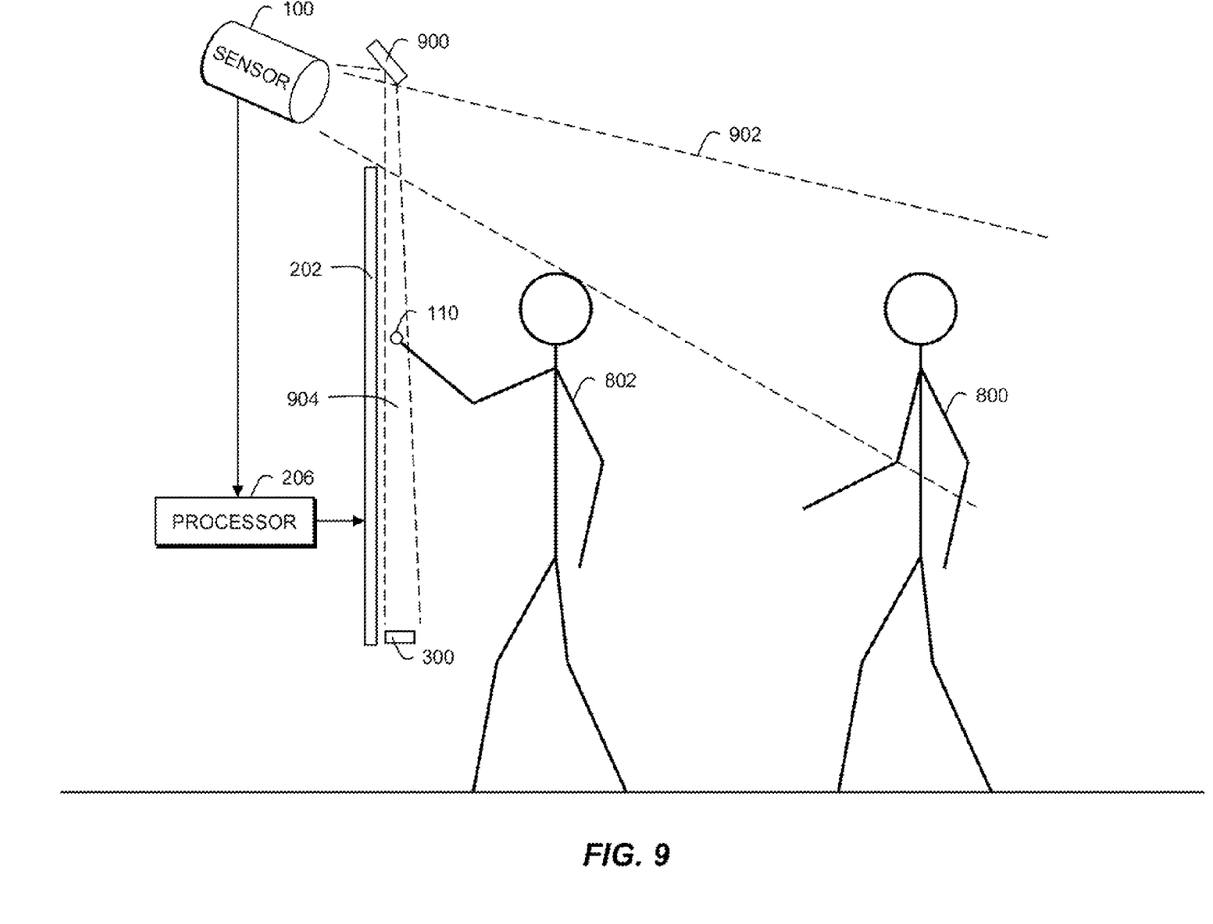
FIG. 9 is a side view of a display showing the fields of view of a single three-dimension depth camera, in accordance with a seventh embodiment of the present invention.

FIG. 9 provides another use for greater depth detection of the sensor. Again, this embodiment shows a side view of the display where the optical sensor 100 is disposed at a distance from the display area. In this embodiment, an intermediate mirror (900) disposed in the primary field of view to split the primary field of view into a near-field portion 904 diverted downward from the sensor to parallel the display area and a far-field portion 902. The near-field portion covers depth that is proximal to the display area, including the first and second fields of view, to detect an object 110 placed with a depth that is proximal to the display area, and the far-field portion covers depth that is distant from the display area, to detect movement and gestures at a depth that is distant from the display area. The optical sensor and processor 206 can detect movement in that is distant from the display area in the far-field portion 902. In the same example as before, a user in a retail establishment can be attracted by a passive image of predefined information (such as an advertisement) on the display 202, and the sensor can detect the movement of the approaching user 800 into the far-field portion of the primary field of view. When the user 802 is able to reach the display by placing a finger or hand (i.e. object) within either the primary and/or reflective field of view of the near-field portion without having the user touch the display, the processor can direct the display to switch to an interactive mode to show interactive information on the display, which can be changed in response to a position of the user's finger or hand (i.e. object) placed within either the primary and/or reflective field of view of the optical sensor without having the user touch the display.

In any of the above embodiments, it is envisioned that the processor can be configured to interpret a user's interactions with the sensor similarly to a user interacting with a touchscreen. This can include interpreting a location of several objects with the sensor's field of view, in order to implement single-touch, multi-touch, and single or multi-touch swipes, as well as the conventional mouse or keyboard interactions of a desktop computer.

Figure 10:
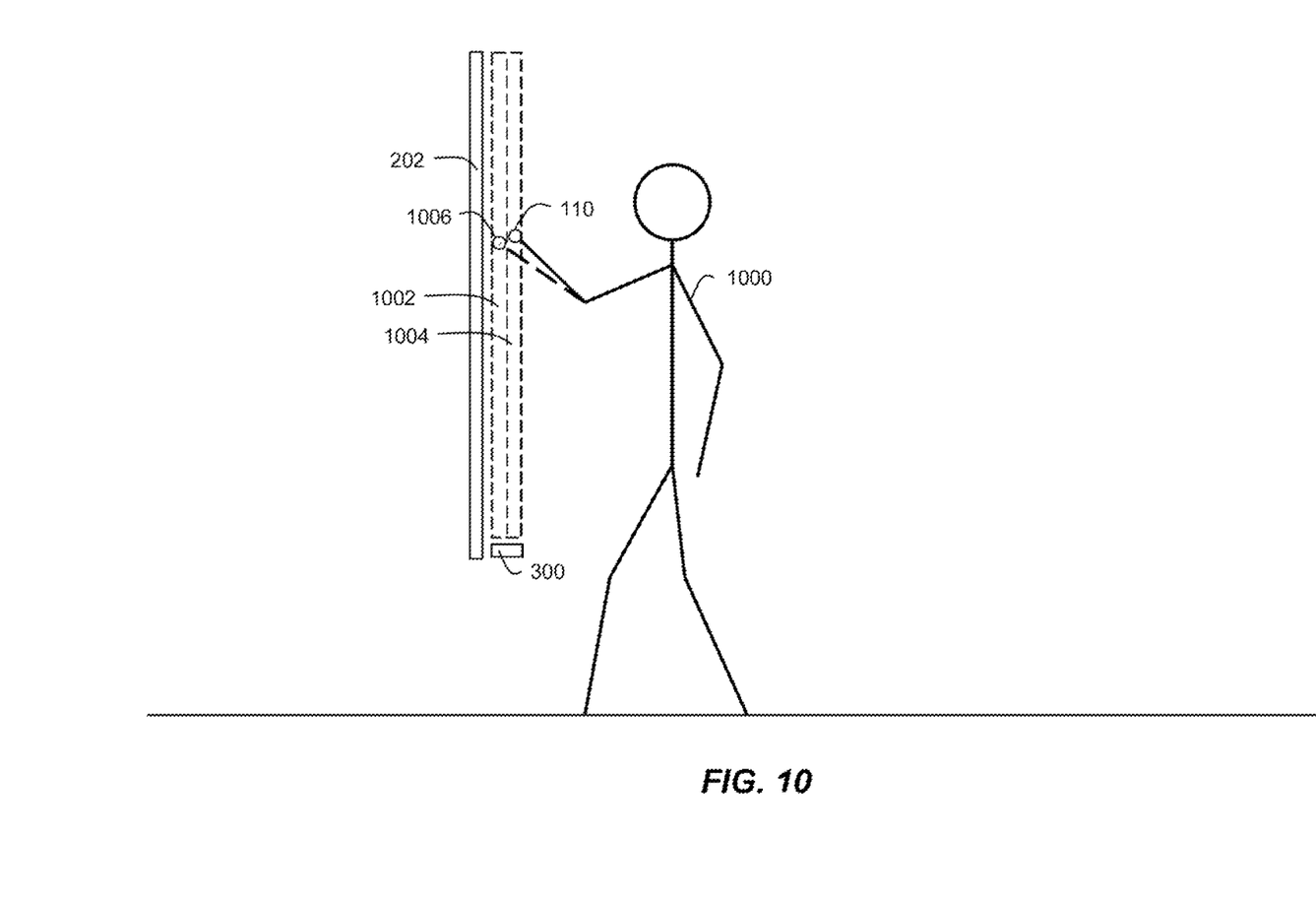
FIG. 10 is a side view of display showing a field of view having multiple detection depths, in accordance with an eighth embodiment of the present invention.

Further, the present invention can provide functions that are not available for today's touchscreens. For example, referring to FIG. 10 showing a side view of the display, the field of view can be divided into multiple touch planes defined as different volumes of space 1002, 1004 above the display area at separate depth ranges perpendicular to a plane of the display 202. In this example, there are two touch planes, a first region 1002 nearer to the display 202, and a second region 1004 farther from the display. These different touch planes can be used to provide different functionality for a user depending on a placement of objects within each plane. For example, interactive icons can be shown on the display, wherein a user placing her hand (object 110) within the second plane 1004 can cause the processor to highlight the icon under the location of her hand without activating that icon's function. The user can move her hand within the second plane 1004 to highlight different icons without activating their functions. It is only when the user moves her hand closer to the display, at a position 1006 within the first plane 1002, to select that (previously highlighted) interactive icon, will the processor activating that selected icon's function. In another example, the display can be showing a keyboard, where moving a finger into the second plane 1004 will highlight a letter on the keyboard to confirm to the user that she will be selecting the correct key when activated by moving her finger further into the first plane 1002.

Figure 11:
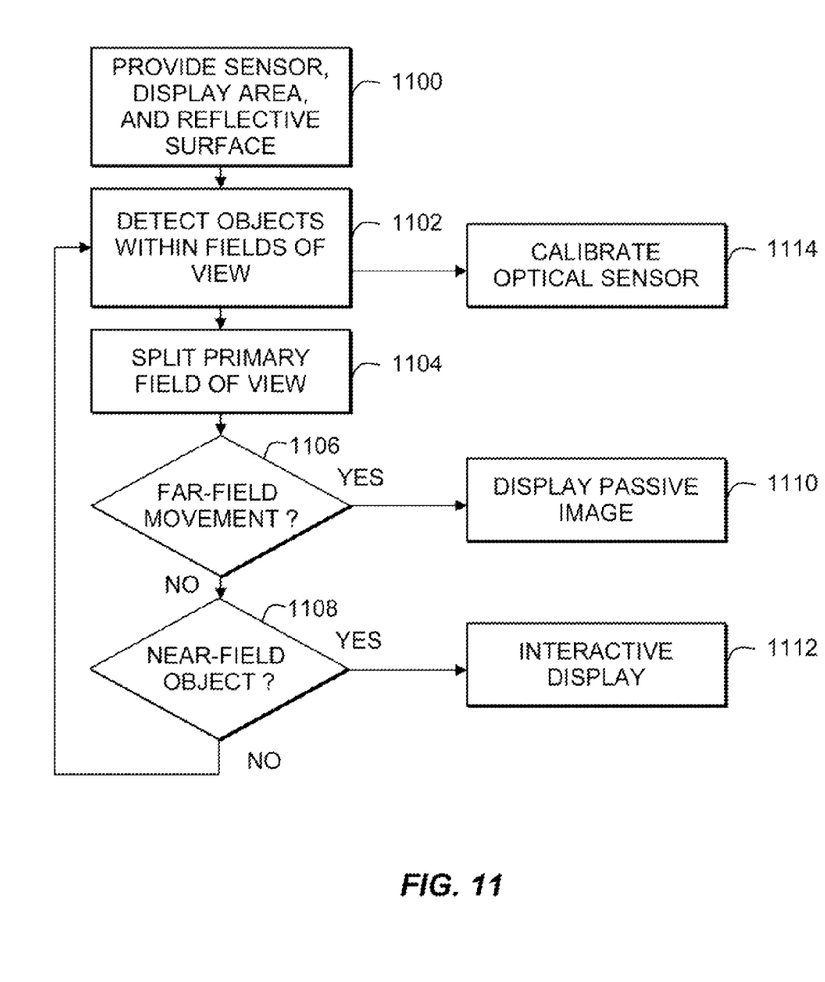
FIG. 11 is a simplified block diagram of a method, in accordance with the present invention.

FIG. 11 illustrates a flowchart of a method for touchless interaction with a display, in accordance with the present invention.

The method starts by providing 1100 a display area defined by a boundary of a display, a reflective surface located along a portion of the boundary and perpendicular to a surface of the display, and an optical sensor disposed opposing the reflective surface, wherein the optical sensor faces the reflective surface and has a primary field of view towards the reflective surface and a secondary filed of view reflected back from the reflective surface, wherein the primary field of view covers a first portion of the display area less than the whole display area, and the secondary field of view covers a second portion of the display area, such that the first and second portions of the display area cover the entire display area. Optionally, the providing step divides the fields of view into multiple touch planes defined as different volumes of space (1002, 1004) above the display area at separate depth ranges perpendicular to a plane of the display A next step includes detecting 1102 an object placed within at least one of its first and second fields of view without having the object touch the display. This step can include detecting a position of the object placed above the display area 1108 (e.g. near-field). This step can also include detecting a depth of the object perpendicular to a plane of the display area. This step can also include detecting movement at a depth that is distant from the display area 1106 (e.g. far-field).

If movement is detected at a depth that is distant from the display area 1006 (e.g. far-field), then a passive image of predefined information can be displayed 1110 on the display. Subsequently, if an object placed with a depth that is proximal to the display area (e.g. near-field), then interactive information is displayed 1112 on the display, where the actual information displayed is in response to a position of the object placed within the fields of view of the optical sensor without having the object touch the display.

An optional step includes splitting 1104 the primary field of view into a near-field portion and a far-field portion, wherein the near-field portion covers depth that is proximal to the display area, including the first and second fields of view, and wherein the far-field portion covers depth that is distant from the display area.

In another option, if the fields of view have been divided into different touch planes, detecting can includes detecting an object within each plane to provide different functionality for a user of the display.

Preferably, the sensor can be calibrated 1114 by placing an object at various points along the reflective surface. If the sensor is not located next to the display, calibration can also include placing an object along the edge nearest the sensor.

Advantageously, the present invention provides a single camera system that can cover an entire display area while being attached to the display to provide a compact form factor. The present invention provides a familiar touchscreen experience to a user without having the user physically touch the screen. The actual touch space can be quite distant from the screen, but close enough to give a planar, touchscreen-like feel to the experience. Not requiring a user to touch the screen has the advantages of better hygiene, no damage to the display, and less cleaning needed for the display. In addition, the present invention allows a user to use gloved hands, which is problematic with touchscreens.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs for ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A touchless interactive display system, comprising:
a display with a display area defined by a boundary of the display;
a reflective surface located along a portion of the boundary and perpendicular to a surface of the display;
one optical sensor disposed opposing the reflective surface, wherein the optical sensor faces the reflective surface and has a primary field of view towards the reflective surface and a reflected field of view reflected back from the reflective surface, wherein the primary field of view covers a first portion of the display area less than the whole display area, and the reflected field of view covers a second portion of the display area, such that the first and second portions of the display area cover the entire display area;
an intermediate mirror disposed in the primary field of view to split the primary field of view into a near-field portion and a far-field portion, wherein the near-field portion covers depth that is proximal to the display area, including the first and second fields of view, to detect an object placed with a depth that is proximal to the display area, and wherein the far-field portion covers depth that is distant from the display area and deeper than a depth of the reflective surface to detect movement at a depth that is distant from the display area; and
a processor coupled with the optical sensor and the display, wherein the optical sensor and processor are operable to detect an object placed in the near-field portion within at least one of its first and second fields of view without having the object touch the display, operable to detect a depth of the object perpendicular to a plane of the display area, and operable detect movement that is distant from the display area in the far-field portion.

2. The system of claim 1 wherein the optical sensor is disposed proximal to the boundary.

3. The system of claim 1, wherein the optical sensor and processor are operable to detect a distance of the object from the optical sensor.

4. The system of claim 1, wherein the optical sensor and processor are operable to detect an angular position of the object from an optical axis of the optical sensor.

5. The system of claim 1, wherein the reflective surface comprises two flat pieces, wherein surfaces of the two flat pieces are inclined to each other.

6. The system of claim 1, wherein further comprising a second reflective surface opposing and parallel with the reflective surface to provide multiple reflected fields of view.

7. The system of claim 1, wherein when a movement with a depth within the far-field that is distant from the display area is detected, the processor directs the display to show predefined information on the display, and wherein when an object is placed with a depth that is proximal to the display area within the near-field is detected, the processor directs the display to show interactive information on the display in response to a position of the object placed within the near-field of the optical sensor without having the object touch the display.

8. The system of claim 7, wherein the fields of view can be calibrated by placing an object at various points along the reflective surface.

9. The system of claim 1, wherein the fields of view are divided by the processor into multiple touch planes defined as different volumes of space above the display area at separate depth ranges perpendicular to a plane of the display, wherein the different touch planes provide different functionality for a user of the display depending on a placement of an object within each plane.

10. A method for touchless interaction with a display, the method comprising the steps of:
providing a display area defined by a boundary of a display, a reflective surface located along a portion of the boundary and perpendicular to a surface of the display, one optical sensor disposed opposing the reflective surface, wherein the optical sensor faces the reflective surface and has a primary field of view towards the reflective surface and a reflected field of view reflected back from the reflective surface, wherein the primary field of view covers a first portion of the display area less than the whole display area, and the reflected field of view covers a second portion of the display area, such that the first and second portions of the display area cover the entire display area, and an intermediate mirror disposed in the primary field of view to split the primary field of view into a near-field portion and a far-field portion, wherein the near-field portion covers depth that is proximal to the display area, including the first and second fields of view, to detect an object placed with a depth that is proximal to the display area, and wherein the far-field portion covers depth that is distant from the display area and deeper than a depth of the reflective surface to detect movement at a depth that is distant from the display area; and
detecting an object placed in the near-field portion within at least one of its first and second fields of view without having the object touch the display, detecting a depth of the object perpendicular to a plane of the display area, and detecting movement that is distant from the display area in the far-field portion.

11. The method of claim 10 wherein detecting includes detecting a position of the object above the display area.

12. The method of claim 10, wherein when detecting detects a movement with a depth within the far-field that is distant from the display area, further comprising displaying predefined information on the display, and wherein when detecting detects an object that is placed with a depth that is proximal to the display area within the near-field, further comprising displaying interactive information on the display in response to a position of the object placed within the near-field of the optical sensor without having the object touch the display.

13. The method of claim 10, wherein the providing step divides the fields of view into multiple touch planes defined as different volumes of space above the display area at separate depth ranges perpendicular to a plane of the display, and wherein the detecting step can detect an object within each plane to provide different functionality for a user of the display.

* * * * *